(12) United States Patent
Okuda et al.

(10) Patent No.: US 8,588,029 B2
(45) Date of Patent: Nov. 19, 2013

(54) OBSTACLE DETECTION DEVICE

(75) Inventors: Yasuyuki Okuda, Aichi-gun (JP);
Hiromi Ariyoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 452 days.

(21) Appl. No.: 12/956,778

(22) Filed: Nov. 30, 2010

(65) Prior Publication Data

US 2011/0149690 A1   Jun. 23, 2011

(30) Foreign Application Priority Data

Dec. 22, 2009   (JP) ................................. 2009-290508

(51) Int. Cl.
*G01S 3/80* (2006.01)
*G01S 5/22* (2006.01)

(52) U.S. Cl.
CPC ....................... *G01S 5/22* (2013.01)
USPC ........................................................ 367/127

(58) Field of Classification Search
USPC ........................................................ 367/127
See application file for complete search history.

(56) References Cited

U.S. PATENT DOCUMENTS

| | | | | |
|---|---|---|---|---|
| 4,813,025 A * | 3/1989 | Rowland et al. | ................... | 367/6 |
| 4,961,039 A * | 10/1990 | Yamauchi et al. | ............. | 340/554 |
| 4,967,860 A * | 11/1990 | Kremser | ........................ | 180/169 |
| 5,668,776 A * | 9/1997 | Katakura | ........................ | 367/89 |
| 6,211,787 B1 * | 4/2001 | Yoshiike et al. | ........... | 340/573.1 |
| 6,778,468 B1 * | 8/2004 | Nishimori et al. | ............. | 367/103 |
| 6,862,935 B2 * | 3/2005 | Fukuda et al. | ................... | 73/602 |
| 7,613,073 B2 * | 11/2009 | Okuda et al. | .................... | 367/99 |
| 2001/0043510 A1 * | 11/2001 | Yanagida et al. | ............. | 367/103 |
| 2002/0126579 A1 * | 9/2002 | Gualtieri | ........................ | 367/103 |
| 2005/0018539 A1 * | 1/2005 | Komai et al. | .................... | 367/99 |
| 2005/0226099 A1 * | 10/2005 | Satoh et al. | ..................... | 367/99 |
| 2007/0268783 A1 * | 11/2007 | Okuda et al. | .................. | 367/189 |
| 2008/0083282 A1 * | 4/2008 | Okuda | ............................ | 73/627 |
| 2008/0089177 A1 * | 4/2008 | Kojima et al. | .................. | 367/93 |
| 2008/0232197 A1 * | 9/2008 | Kojima et al. | .................. | 367/99 |
| 2008/0232198 A1 * | 9/2008 | Hayasaka et al. | ............... | 367/99 |
| 2009/0016162 A1 * | 1/2009 | Takagi et al. | ................... | 367/99 |
| 2009/0028002 A1 * | 1/2009 | Sugiura et al. | .................. | 367/99 |
| 2009/0040094 A1 * | 2/2009 | Harada et al. | ................... | 342/59 |
| 2009/0059726 A1 * | 3/2009 | Okuda | ........................... | 367/178 |
| 2009/0135672 A1 * | 5/2009 | Matsuura et al. | ............. | 367/100 |
| 2009/0168603 A1 | 7/2009 | Okuda et al. | | |

FOREIGN PATENT DOCUMENTS

| | | |
|---|---|---|
| JP | A-7-260933 | 10/1995 |
| JP | A-2000-214259 | 8/2000 |
| JP | A-2002-120679 | 4/2002 |
| JP | A-2002-131426 | 5/2002 |
| JP | A-2005-121509 | 5/2005 |

(Continued)

*Primary Examiner* — Isam Alsomiri
*Assistant Examiner* — James Hulka
(74) *Attorney, Agent, or Firm* — Posz Law Group, PLC

(57) ABSTRACT

An obstacle detection device mountable on a surface of a movable body includes a transmitting portion for transmitting a transmitting wave, a receiving portion for receiving a reflected wave from an obstacle, a distance calculating portion, a direction calculating portion, a distance storing portion, a direction storing portion, a distance change calculating portion, a direction change calculating portion, and a determining portion. The determining portion determines a shape of the obstacle and a relative position of the obstacle to the movable body based on a direction of the obstacle calculated by the direction calculating portion, the amount of distance change calculated by the distance change calculating portion, and the amount of direction change calculated by the direction change calculating portion.

8 Claims, 10 Drawing Sheets

(56) References Cited

FOREIGN PATENT DOCUMENTS

| JP | A-2005-319945 | 11/2005 |
| JP | A-2006-343309 | 12/2006 |
| JP | A-2007-131169 | 5/2007 |
| JP | A-2007-139665 | 6/2007 |

* cited by examiner

SINGLE

OBSTACLE DETECTION DEVICE

CROSS REFERENCE TO RELATED APPLICATIONS

The present application is based on and claims priority to Japanese Patent Application No. 2009-290508 filed on Dec. 22, 2009, the contents of which are incorporated in their entirety herein by reference.

BACKGROUND OF THE INVENTION

1. Field of the Invention

The present invention relates to an obstacle detection device that is mountable on a surface of a movable body.

2. Description of the Related Art

A conventional obstacle detection device includes at least one transmitting element and a plurality of receiving elements arranged in an array. The transmitting element outputs a transmitting wave. A reflected wave that is the transiting wave reflected by an obstacle is received with the receiving elements. Accordingly, the obstacle detection device detects a distance to the obstacle and a direction of the obstacle. In a case where an obstacle detection device is mounted on a vehicle, for example, the obstacle detection device can detect an object in the rear of the vehicle as an obstacle when the vehicle moves rearward. A wall and a pole may become an obstacle when the vehicle moves rearward. When a wall is located in the rear of the vehicle, the vehicle may collide against the wall at a large area in a width direction of the vehicle. When a pole is located in the rear of the vehicle, the vehicle may collide against the pole at a small area in the width direction of the vehicle. In a case where an obstacle detection device is mounted on a vehicle, the obstacle is generally disposed on a surface of a vehicle body. For example, the obstacle detection device is disposed on a surface of a rear bumper of the vehicle.

In a case where an obstacle is a wall that provides a planar surface in a direction detecting direction, a reference point of the obstacle that is used when the obstacle detection device calculates a distance to the obstacle is a point where a perpendicular line from the obstacle detection device crosses the planar surface. When the vehicle moves rearward in a direction perpendicular to the planar surface of the wall, a bumper surface of the rear bumper is substantially parallel to the surface of the wall. Thus, a distance between a portion of the bumper surface of the rear bumper and the surface of the wall is the shortest distance, and the calculated distance to the object is substantially same as the shortest distance between the vehicle and the wall. When the vehicle moves rearward in an oblique direction to the surface of the wall, the bumper surface of the rear bumper is not parallel to the surface of the wall. Thus, a distance between an end of the bumper surface of the rear bumper and the surface of the wall is the shortest distance, and the calculated distance to the obstacle is not same as the shortest distance between the vehicle and the wall.

In order to solve the above-described issue, it is required to determine a shape of the obstacle and a relative position of the obstacle to the vehicle as well as the distance to the obstacle and the direction of the obstacle and to calculate the shortest distance based on the shape of the obstacle and the relative position of the obstacle to the vehicle. For example, JP-A-2006-343309 discloses an obstacle detection device in which a history of a vehicle position at a time when the obstacle detection device detects an obstacle is stored, a correlation between the history of the vehicle position and running information including a vehicle speed and a steering angle is updated, and thereby a shape of the obstacle is determined.

In the above-described obstacle detection device needs to receive the running information including the vehicle speed and the steering angle from an external device. Thus, the obstacle detection device needs a configuration for receiving the information from the external device and a configuration for processing the information from the external device.

SUMMARY OF THE INVENTION

In view of the foregoing problems, it is an object of the present invention to provide an obstacle detection device that can properly determine a shape of an obstacle and a relative position of the obstacle to a movable body.

According to an aspect of the present invention, an obstacle detection device includes a transmitting portion, a receiving portion, a distance calculating portion, a direction calculating portion, a distance storing portion, a direction storing portion, a distance change calculating portion, a direction change calculating portion, and a determining portion. The transmitting portion includes one or more transmitting elements and outputs an ultrasonic wave from the one or more transmitting elements as a transmitting wave. The receiving portion includes a plurality of receiving elements disposed in an array and receives a reflected wave at the receiving elements. The reflected wave is the transmitting wave reflected by an obstacle. The distance calculating portion calculates a distance to the obstacle based on a time difference between a transmitting time when the transmitting portion outputs the transmitting wave and a receiving time when the receiving portion receives the reflected wave and a speed of the transmitting wave. The direction calculating portion calculates a direction of the obstacle based on a phase difference between a phase of the reflected wave received with one of the receiving elements and a phase of the reflected wave received with another of the receiving elements, a distance between the one of the receiving elements and the another of the receiving elements, and a wavelength of the transmitting wave. The distance storing portion stores the distance to the obstacle calculated by the distance calculating portion. The direction storing portion stores the direction of the obstacle calculated by the direction calculating portion. Due to a change in relative position of the obstacle to the surface of the movable body, the amount of distance change and the amount of direction change are generated. The distance change calculating portion calculates the amount of distance change based on the distance to the obstacle stored in the distance storing portion. The direction change calculating portion calculates the amount of direction change based on the direction of the obstacle stored in the direction storing portion. The determining portion determining a shape of the obstacle and the relative position of the obstacle to the movable body based on the direction of the obstacle calculated by the direction calculating portion, the amount of distance change calculated by the distance change calculating portion, and the amount of direction change calculated by the direction change calculating portion. The determining portion outputs a determination result.

The above-described obstacle detection device can properly determine the shape of the obstacle and the relative position of the obstacle to the movable body.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS (First Embodiment)

Figure 1:
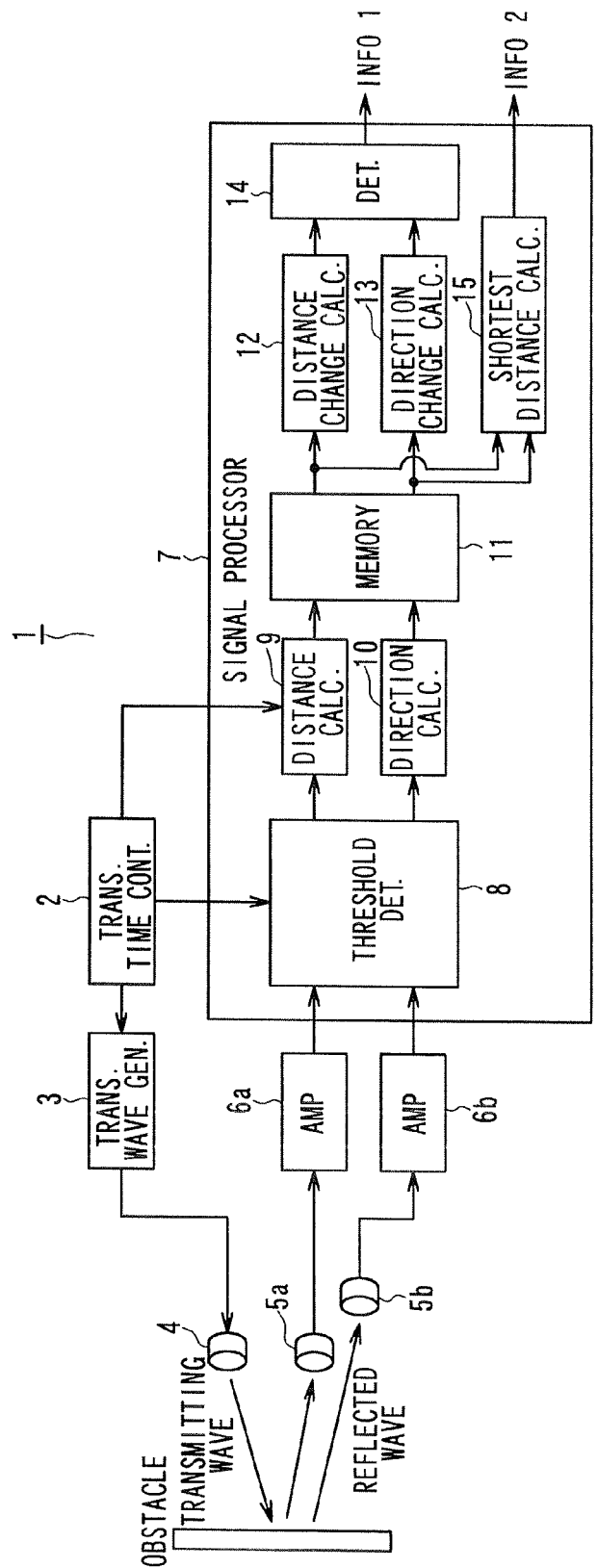
FIG. 1 is a block diagram showing an obstacle detection device according to a first embodiment of the present invention.

An obstacle detection device 1 according to a first embodiment of the present invention will be described with reference to FIG. 1 to FIG. 4. The obstacle detection device 1 is mountable to a movable body. The movable body includes, for example, a vehicle. As shown in FIG. 1, the obstacle detection device 1 includes a transmitting time controller (TRANS. TIME CONT.) 2, a transmitting wave generator (TRANS. WAVE GEN.) 3, a transmitting microphone 4, receiving microphones 5a and 5b, signal amplifiers (AMP) 6a and 6b, and a signal processor 7. The transmitting microphone 4 can function as a transmitting portion and a transmitting element. The receiving microphones 5a and 5b can function as a receiving portion and receiving elements. The signal processor 7 includes a threshold determining portion (THRESHOLD DET.) 8, a distance calculating portion (DISTANCE CALC.) 9, a direction calculating portion (DIRECTION CALC.) 10, a memory 11, a distance change calculating portion (DISTANCE CHANGE CALC.) 12, a direction change calculating portion (DIRECTION CHANGE CALC.) 13, a determining portion (DET.) 14, and a shortest distance calculating portion (SHORTEST DISTANCE CALC.) 15. The memory 11 can function as a distance storing portion and a direction storing portion.

The transmitting time controller 2 determines a transmitting time of a transmitting wave. The transmitting time controller 2 outputs a transmitting time signal that indicates a determined transmitting time to the transmitting wave generator 3, the threshold determining portion 8, and the distance calculating portion 9. When the transmitting wave generator 3 receives the transmitting time signal from the transmitting time controller 2, the transmitting wave generator 3 outputs a transmitting wave to the transmitting microphone 4. The transmitting wave is an ultrasonic wave having a predetermined angular frequency and a predetermined pulse number (for example, 10 pulses).

The transmitting microphone 4 is a resonance microphone in which a piezoelectric element is covered with a cover. When the piezoelectric element is actuated, the cover resonates. When the transmitting microphone 4 receives the transmitting wave from the transmitting wave generator 3, the transmitting wave is supplied to the piezoelectric element, the piezoelectric element is actuated, and the cover resonates. Accordingly, the transmitting wave is output to an outside. When the transmitted wave from the transmitting microphone 4 collides against an obstacle, a part of the transmitted wave is reflected by the obstacle and becomes a reflected wave. In a case where a surface with which the transmitted wave collides is a plane, a reflecting direction of the reflected wave is perpendicular to the plane. In a case where a surface with which the transmitted wave collides is a curved surface, a reflecting direction of the reflected wave is perpendicular to a tangent to the curved surface.

Each of the receiving microphones 5a and 5b is a resonance microphone in which a piezoelectric element is covered with a cover. When the piezoelectric element is actuated, the cover resonates. When the receiving microphones 5a and 5b receive the reflected wave from the obstacle, the receiving microphones 5a and 5b output receiving signals to the signal amplifiers 6a and 6b, respectively. The receiving signal corresponds to a voltage generated in the piezoelectric element. In a case where the obstacle detection device 1 is disposed on the vehicle, the receiving microphones 5a and 5b are arranged adjacent to each other in a horizontal direction to the ground. A distance between the receiving microphones 5a and 5b is, for example, a half of a wavelength of the transmitting wave generated in the transmitting wave generator 3. When the receiving microphones 5a and 5b are arranged adjacent to each other in the horizontal direction to the ground, a phase difference between a phase of the reflected wave received with the receiving microphone 5a and a phase of the reflected wave received with the receiving microphone 5b is generated in the horizontal direction. Thus, a direction detecting direction is the horizontal direction.

When the signal amplifier 6a and 6b receive the receiving signals from the receiving microphones 5a and 5b, the signal amplifier 6a and 6b amplify the receiving signals based on a predetermined amplification factor and output the amplified receiving signals to the threshold determining portion 8.

The threshold determining portion 8 includes an A/D converter, an orthogonal demodulator, and a low pass filter (LPF). When the threshold determining portion 8 receives the receiving signals from the signal amplifiers 6a and 6b, the threshold determining portion 8 samples the receiving signals at a predetermined sampling frequency and converts the sampled receiving signals into digital signals. The predetermined sampling frequency is a frequency more than double of a frequency of the transmitting wave based on a sampling theorem. For example, the predetermined sampling frequency is four times of the frequency of the transmitting wave. The threshold determining portion 8 multiplies the receiving signals converted into the digital signals and a sine wave based on the transmitting time indicated by the transmitting time signal from the transmitting time controller 2, divides the receiving signals to an in-phase component (I-component) receiving signal and a quadrature component (Q-component) receiving signal, and removes a high-frequency component from the receiving signals. Furthermore, the threshold determining portion 8 calculates amplitudes of the I-component receiving signal and the Q-component receiving signal. When the amplitude is greater than or equal to a predetermined threshold value, the threshold determining portion 8 determines a time when the reflected wave is received based on a time when the amplitude of the receiving signals become greater than or equal to the threshold value. Then, the threshold determining portion 8 outputs a receiving time signal, which indicates the determined receiving time, to the distance calculating portion 9 and the direction calculating portion 10.

When the distance calculating portion 9 receives the transmitting time signal from the transmitting wave generator 3 and receiving time signal from the threshold determining portion 8, the distance calculating portion 9 calculates a distance to the obstacle based on a time difference between the transmitting time and the receiving time and a sound speed, and outputs the distance to the obstacle to the memory 11. The sound speed corresponds to a speed of the transmitting wave. When the temperature is "T ° C.," the sound speed at "T ° C." is "C," a time difference between the transmitting time and the receiving time is "Δt," and the distance to the obstacle is "D," the distance calculating portion 9 calculates the sound speed "C" at "T ° C." from the following equation.

$$C=331.5+0.61 \times T$$

Then, the distance calculating portion 9 calculates the distance "D" to the obstacle from the following equation.

$$D=C \times \Delta T/2$$

When the direction calculating portion 10 receives the receiving time signal from the threshold determining portion 8, the direction calculating portion 10 calculates a direction of the obstacle based on a phase difference between the phase of the reflected wave received with the receiving microphone 5a and the phase of the reflected wave received with the receiving microphone 5b, the distance between the receiving microphones 5a and 5b, and the wavelength of the transmitting wave, and outputs the direction of the obstacle to the memory 11. The direction of the obstacle is expressed as an angle from a direction that is perpendicular to a line connecting the receiving microphones 5a and 5b. When the frequency of the transmitting wave is "f," the wavelength of the transmitting wave is "λ," and the phase difference between the phase of the reflected wave received with the receiving microphone 5a and the phase of the reflected wave received with the receiving microphone 5b is "Δϕ," the distance between the receiving microphones 5a and 5b is "a," and the direction of the obstacle is "θ," the direction calculating portion 10 calculates the wavelength "λ" of the transmitting wave from the following equation.

$$\lambda = C/f$$

Then, the direction calculation portion 10 calculates the direction "θ" of the obstacle from the following equation.

$$\theta = \arcsin(\lambda \times \Delta\phi/(2\pi \times a))$$

When the memory 11 sequentially receives the distance to the obstacle from the distance calculating portion 9 at a predetermined calculating time, the memory 11 sequentially stores the distance to the obstacle. When the memory 11 sequentially receives the direction of the obstacle from the direction calculating portion 10 at a predetermined calculating time, the memory 11 sequentially stores the direction of the obstacle.

The distance change calculating portion 12 calculates the amount of change in the distance to the obstacle (the amount of distance change) based on at least two distances to the obstacle that are calculated at different calculating times and stored in the memory 11. Then, the distance change calculating portion 12 outputs the calculated amount of distance change to the determining portion 14. The direction change calculating portion 13 calculates the amount of change in the direction of the obstacle (the amount of direction change) based on at least two directions of the obstacle that are calculated at different calculating times and stored in the memory 11. Then, the direction change calculating portion 13 outputs the calculated amount of direction change to the determining portion 14.

When the determining portion 14 receives the amount of distance change from the distance change calculating portion 12 and the amount of direction change from the direction change calculating portion 13, the determining portion 14 determines the shape of the obstacle and the relative position of the obstacle to the vehicle based on the amount of distance change and the amount of direction change. Then, the determining portion 14 outputs obstacle information (INFO1) including the determined shape of the obstacle and the determined relative position of the obstacle to the vehicle to an external device. The shortest distance calculating portion 15 calculates the shortest distance from the vehicle to the obstacle based on the distance to the obstacle and the direction of the obstacle stored in the memory 11. Then, the shortest distance calculating portion 15 outputs shortest distance information (INFO2) including the calculated shortest distance to an external device.

Figure 2:
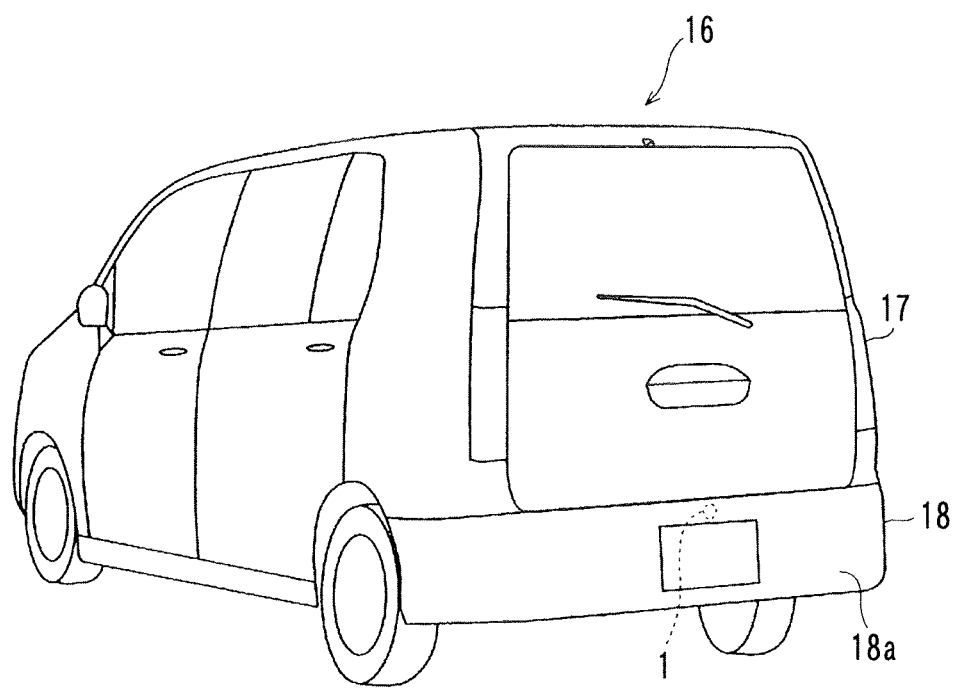
FIG. 2 is a diagram showing a state where the obstacle detection device according to the first embodiment is disposed on a vehicle.

For example, the obstacle detection device 1 is mounted on a vehicle body 17 of a vehicle 16. As shown in FIG. 2, the obstacle detection device 1 is buried in a center portion of a bumper surface 18a of a rear bumper 18 of the vehicle body 17 in a width direction. Thus, the obstacle detection device 1 detects an obstacle located in the rear of the vehicle 16. The obstacle detection device 1 can determine a shift position of the vehicle 16 by receiving a shift position signal that indicates the shift position of the vehicle 16 from an ECU or a sensor. The obstacle detection device 1 can also determine an on-off state of an ignition switch by receiving an ignition signal that indicates an on-off state of the ignition switch. The obstacle detection device 1 activates when the ignition switch is in the on-state.

Figure 3:
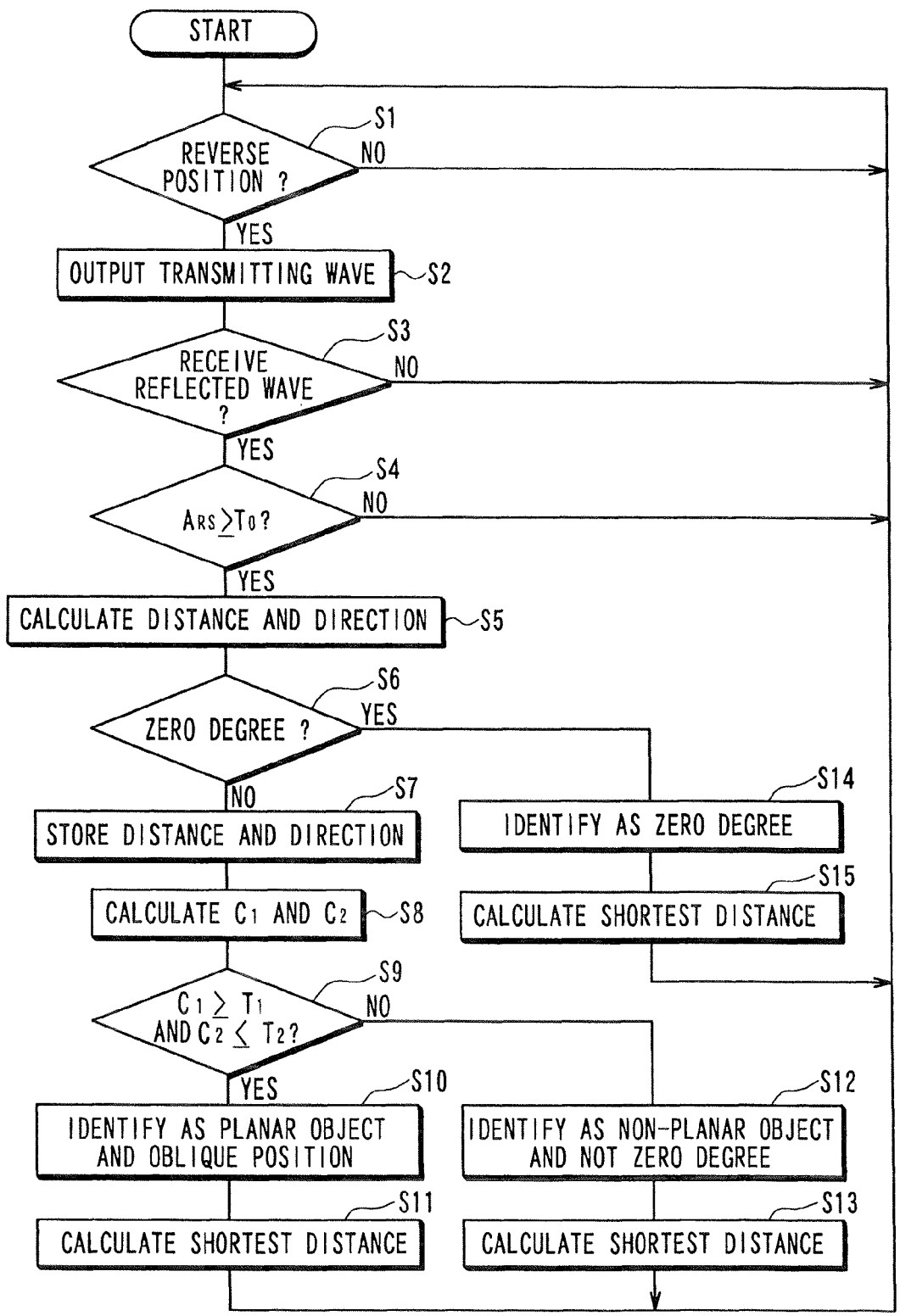
FIG. 3 is a flowchart showing processes performed by the obstacle detection device according to the first embodiment.

An exemplary operation of the obstacle detection device 1 will be described with reference to FIG. 3 and FIG. 4. When the ignition switch is in the on-state, the obstacle detection device 1 is activated. At S1, the obstacle detection device 1 determines whether the shift position is a reverse position used for moving the vehicle rearward based on the shift position signal receive from the ECU or the sensor. When the obstacle detection device 1 determines that the shift position is the reverse position, which corresponds to "YES" at S1, the process proceeds to S2. When the obstacle detection device 1 determines that the shift position in not the reverse position, which corresponds to "NO" at S1, the obstacle detection device 1 repeats the process at S1 until the shift position becomes the reverse position. At S2, the obstacle detection device 1 outputs a transmitting wave generated at the transmitting wave generator 3 from the transmitting microphone 4, and the process proceeds to S3. If an obstacle including a wall and a pole is located in the rear of the vehicle, and a part of the transmitting wave from the transmitting microphone 4 collides against the obstacle and is reflected, a part of the transmitting wave reflected by the obstacle becomes a reflected wave and is received with the receiving microphones 5a and 5b.

At S3, the obstacle detection device 1 determines whether the receiving microphones 5a and 5b receive a reflected wave from an obstacle. When the obstacle detection device 1 determines that the receiving microphones 5a and 5b receive the reflected wave from the obstacle, which corresponds to "YES" at S3, the process proceeds to S4. When the obstacle detection device 1 determines that the receiving microphones 5a and 5b do not receive the reflected wave, the process returns to S1. At S4, the obstacle detection device 1 determines whether the amplitudes ($A_{RS}$) of the receiving signals corresponding to the reflected waves received with the receiving microphones 5a and 5b are greater than or equal to the threshold value ($T_0$) at the threshold determining portion 8. Then, based on a time when the amplitude of the receiving signals becomes greater than or equal to the threshold value, the obstacle detection device 1 determines the receiving time of the reflected wave.

When the obstacle detection device 1 determines that the amplitude ($A_{RS}$) of the receiving signals is greater than or equal to the threshold value ($T_0$), which corresponds to "YES" at S4, the process proceeds to S5. At S5, the obstacle detection device 1 calculates the distance to the obstacle at the distance calculating portion 9 based on the time difference between the transmitting time of the transmitting wave and the receiving time of the reflected wave and the sound speed. In addition, the obstacle detection device 1 calculates the direction of the obstacle at the direction calculating portion 10 based on the phase difference between the phase of the reflected wave received with the receiving microphone 5a and the phase of the reflected wave received with the receiving microphone 5b, the distance between the receiving microphones 5a and 5b, and the wavelength of the transmitting wave. Then, the process proceeds to S6. At S6, the obstacle detection device 1 determines whether the calculated direction is zero degree. In the present application, "zero degree" includes zero degree and directions around zero degree within a margin of tolerance and error.

When the obstacle detection device 1 determines that the calculated direction is not about zero degrees, which corresponds to "NO" at S6, the process proceeds to S7. At S7, the obstacle detection device 1 stores the distance to the obstacle and the direction of the obstacle in the memory 11. Then, the process proceeds to S8. At S8, the obstacle detection device 1 calculates the amount of distance change ($C_1$) at the distance change calculating portion 12 based on at least two distances to the obstacle that are calculated at different times and stored in the memory 11. In addition, the obstacle detection device 1 calculates the amount of direction change ($C_2$) at the direction change calculating portion 12 based on at least two directions of the obstacle that are calculated at different times and stored in the memory 11. Then, the process proceeds to S9.

At S9, the obstacle detection device 1 compares the amount of distance change ($C_1$) with a first predetermined value ($T_1$) and the amount of direction change ($C_2$) with a second predetermined value ($T_2$). The first predetermined value ($T_i$) and the second predetermined value ($T_2$) may be set in a manufacturing process and may also be set after shipment or after mounted on the vehicle.

When the obstacle detection device 1 determines that the absolute value of the amount of distance change ($C_1$) is greater than or equal to the first predetermined value ($T_1$) and the absolute value of the amount of direction change ($C_2$) is less than or equal to the second predetermined value ($T_2$), which corresponds to "YES" at S9, the process proceeds to S10. At S10, the determining portion 14 in the obstacle detection device 1 identifies that the obstacle is a planar object that has a planar surface in the direction detecting direction and that a relative position of the planar surface of the obstacle to the bumper surface 18a of the rear bumper 18 is oblique. Then, the process proceeds to S11 and the obstacle detection device 1 calculates the shortest distance to the obstacle, which is identified as the planar object, at the shortest distance calculating portion 15.

When the obstacle detection device 1 determines that the absolute value of the amount of distance change ($C_1$) is not greater than or equal to the first predetermined value ($T_1$) or that the absolute value of the amount of direction change ($C_2$) is not less than or equal to the second predetermined value ($T_2$), which corresponds to "NO" at S9, the process proceeds to S12. At S12, the determining portion 14 in the obstacle detection device 1 identifies that the obstacle is a non-planar object that does not have a planar surface in the direction detecting direction and that the direction of the obstacle is not zero degree. Then, the process proceeds to S13 and the obstacle detection device 1 calculates the shortest distance to the obstacle, which is identified as the non-planar object, at the shortest distance calculating portion 15.

Figure 4A:
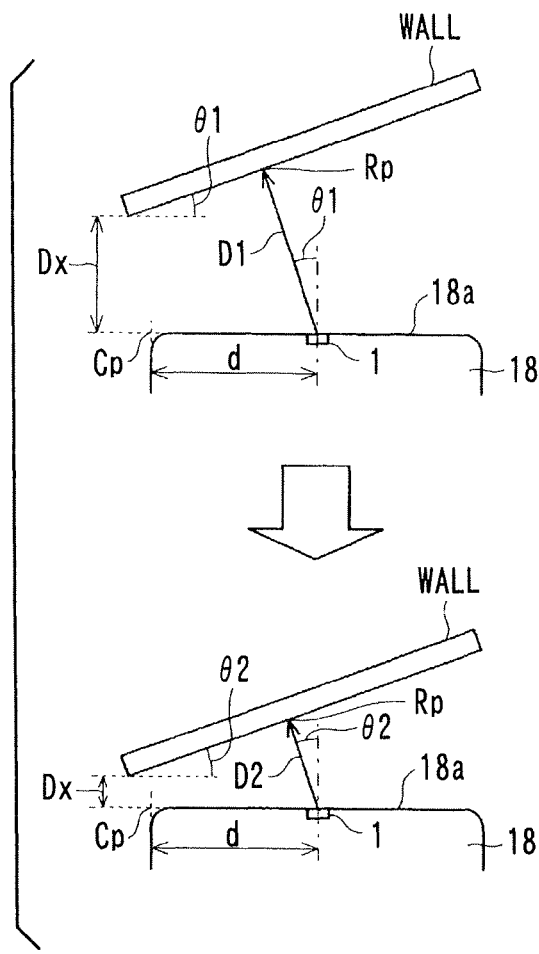
FIG. 4A is a diagram showing a principle of detecting a wall.
Figure 4B:
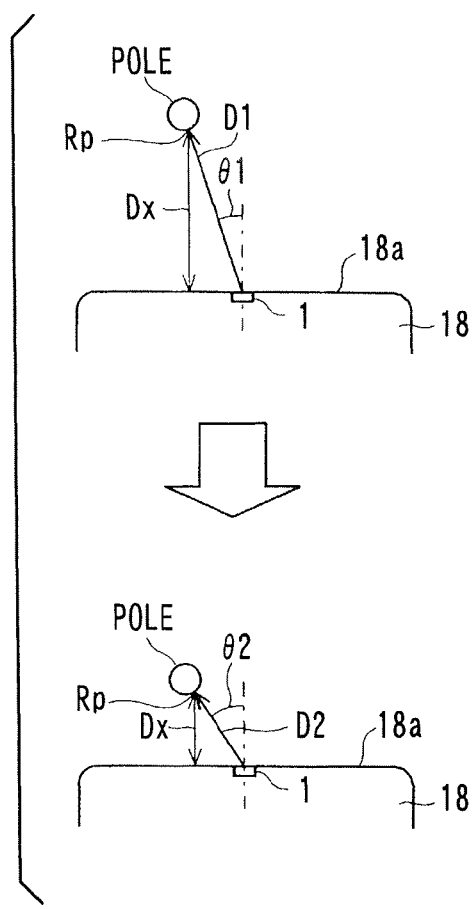
FIG. 4B is a diagram showing a principle of detecting a pole.
Figure 5:
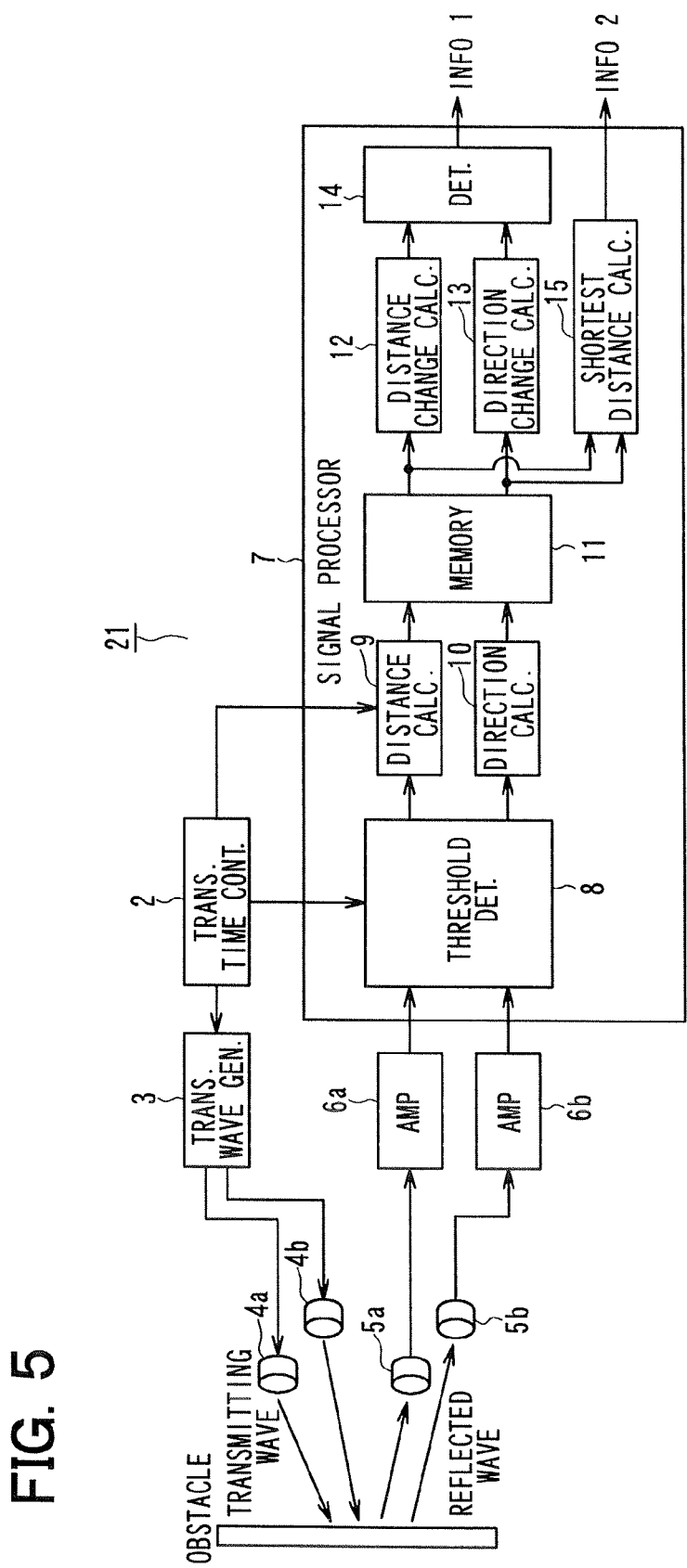
FIG. 5 is a block diagram showing an obstacle detection device according to a second embodiment of the present invention.

As shown in FIG. 4A and FIG. 4B, when a distance to an obstacle and a direction of the obstacle calculated at time t1 are respectively expressed as D1 and θ1, and a distance to the obstacle and the direction of the obstacle calculated at time t2 after time t1 are respectively expressed as D2 and θ2, the following phenomenon may occur.

In a case where an obstacle is a wall standing upright and having a planar surface in the direction detecting direction and the vehicle 16 moves rearward in a direction oblique to the planar surface of the wall, as shown in FIG. 4A, even when the distance to the obstacle decreases with time, the direction of the obstacle does not change with time. Thus, the following relationships are satisfied.

D1>D2

θ1≈θ2

In a case where an obstacle is a pole standing upright and not having a planar surface in the direction detecting direction and the direction of the obstacle is not zero degree, the direction of the obstacle changes with time when the distance to the obstacle decreases with time. Thus, the following relationships are satisfied.

D1>D2

θ1<θ2

Based on the above-described phenomenon, when the obstacle detection device 1 determines that the direction of the obstacle is not zero degree, the absolute value of the amount of distance change is greater than or equal to the first predetermined value, and the absolute value of the amount of direction change is less than or equal to the second predetermined value, the obstacle detection device 1 identifies that the obstacle is a planar object having a planar surface in the direction detecting direction and that the relative position of the planar surface of the obstacle to the vehicle 16 (i.e., the bumper surface 18a) is oblique. When the obstacle detection device 1 determines that the direction of the obstacle is not zero degree, and the absolute value of the amount of distance change is less the first predetermined value or the absolute value of the amount of direction change is greater than the second predetermined value, the obstacle detection device 1 identifies that the obstacle is a non-planar object that does not have a planar surface in the direction detecting direction and that the direction of the obstacle is not zero degree.

When the obstacle detection device 1 identifies that the obstacle is a planar object having a planar surface in the direction detecting direction and that the relative position the planar surface of the obstacle to the vehicle 16 is oblique, the obstacle detection device 1 calculates the shortest distance "Dx" between the bumper surface 18a and the obstacle from the following equation.

$$D_x = D/\cos\theta - d \times \tan\theta$$

where "D" is the distance to the obstacle calculated by the distance calculating portion 9, "θ" is the direction of the obstacle calculated by the direction calculating portion 10, and "d" is a distance between a shortest distance calculating point (Cp) of the bumper 18a and a position at which the obstacle detection device 1 is disposed.

When the obstacle detection device 1 identifies that the obstacle is a non-planar object that does not have a planar surface in the direction detecting direction and that the direction of the obstacle is not zero degree, the obstacle detection device 1 calculates the shortest distance "$D_x$" between the bumper surface 18a and the obstacle from the following equation.

$$D_x = D \times \cos\theta$$

Then, the obstacle detection device 1 outputs the obstacle information (INFO1) and the shortest distance information (INFO2) to an external device. The obstacle information includes the shape of the obstacle and the relative position of the obstacle to the vehicle 16 determined by the determining portion 14. The shortest distance information indicates the shortest distance to the obstacle calculated by the shortest distance calculating portion 15. The obstacle information and the shortest distance information output from the obstacle detection device 1 may be input to an in-vehicle display device and may be displayed on the display device so that a user can be visually notified of the shape of the obstacle, the relative position of the obstacle to the vehicle 16, and the shortest distance from the vehicle 16 to the obstacle. The obstacle information and the shortest distance information may also be input to an in-vehicle speaker and may be output from the speaker so that a user can be aurally notified of the shape of the obstacle, the relative position of the obstacle to the vehicle 16, and the shortest distance from the vehicle 16 to the obstacle. The obstacle information and the shortest distance information may also be input to a running control ECU so that an operation of an accelerator is forcibly weakened and an operation of a brake is forcibly enhanced based on the shortest distance. The above-described examples may be used in combination.

When the obstacle detection device 1 determines that the calculated direction is zero, which corresponds to "YES" at S6, the determining portion 14 identifies that the direction of the obstacle is zero degree at S14 without identifying whether the obstacle is a planar object or a non-planar object, and the shortest distance calculating portion 15 calculates the shortest distance to the obstacle, whose direction is identified as zero degree, at S15.

As described above, in the obstacle detection device 1 according to the present embodiment, when the direction calculated at the direction calculating portion 10 is determined as not zero degree, the absolute value of the amount of distance change calculated at the distance change calculating portion is determined to be greater than or equal to the first threshold value and the absolute value of the amount of direction change calculated at the direction change calculating portion 13 is determined to be less than or equal to the second threshold value, the obstacle is identified as a planar object, and the relative position of the obstacle to the vehicle 16 is identified as oblique. When the absolute value of the amount of distance change calculated at the distance change calculating portion 12 is determined to be not greater than or equal to the first threshold value or the absolute value of the amount of direction change calculated at the direction change calculating portion 13 is determined to be not less than or equal to than the second threshold value, the obstacle is identified as a non-planar object and the direction of the obstacle is identified as not zero degree. Therefore, the obstacle detection device 1 can properly determine the shape of the obstacle and the relative position of the obstacle with a simple structure.

(Second Embodiment)

An obstacle detection device 21 according to a second embodiment of the present invention will be described with reference to FIG. 5 to FIG. 8C. The obstacle detection device 21 includes two transmitting microphones 4a and 4b. The obstacle detection device 21 is switchable between a narrow transmitting mode and a wide transmitting mode. In the narrow transmitting mode, the transmitting microphones 4a and 4b output the transmitting wave in the same phase. In the wide transmitting mode, the transmitting microphones 4a and 4b output the transmitting wave in the opposite phase.

When each of the transmitting microphones 4a and 4b receives the transmitting wave from the transmitting wave generator 3, the transmitting wave is supplied to a piezoelectric element, the piezoelectric element is actuated, and a cover resonates. Accordingly, the transmitting wave is output. In a case where the obstacle detection device 21 is mounted on a vehicle, the transmitting microphones 4a and 4b are arranged adjacent to each other in a horizontal direction with respect to the ground in a manner similar to the receiving microphones 5a and 5b. A distance between the transmitting microphones 4a and 4b is, for example, a half of a wavelength of the transmitting wave generated in the transmitting wave generator 3.

Figure 6A:
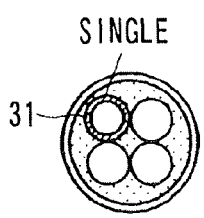
FIG. 6A is a diagram showing a first case where only one of transmitting and receiving microphones output a transmitting wave.
Figure 6B:
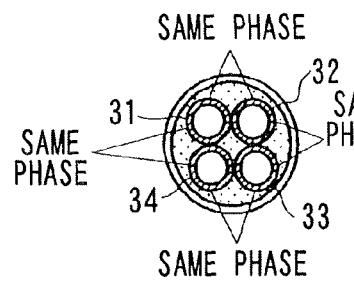
FIG. 6B is a diagram showing a second case where all transmitting and receiving microphones output a transmitting wave in the same phase.
Figure 6C:
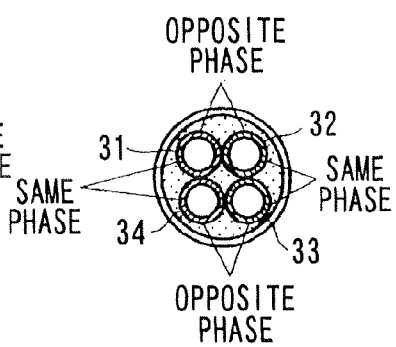
FIG. 6C is a diagram showing a third case where transmitting and receiving microphones output a transmitting wave in the opposite phase.
Figure 6D:
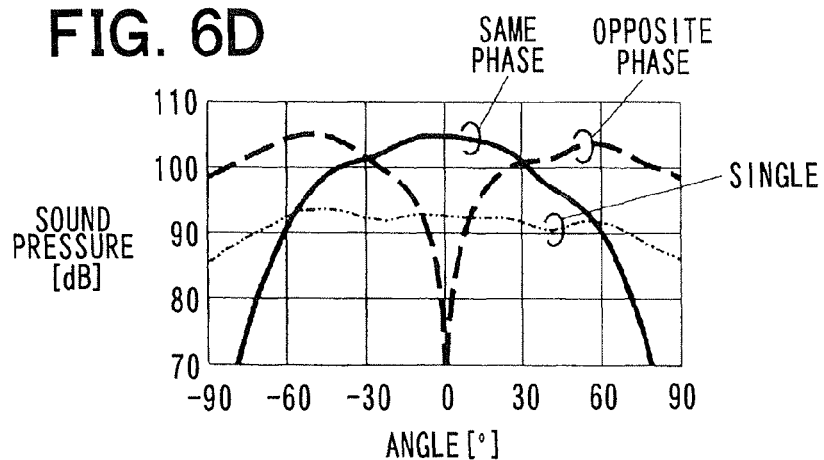
FIG. 6D is a graph showing relationships between an angle and a sound pressure in the first to third cases.

Three cases where a plurality of transmitting microphones outputs the transmitting wave in the same phase or the opposite phase will be described with reference to FIG. 6A to FIG. 6D. In each of first to third cases, four transmitting and receiving microphones 31-34 are arranged in a square shape. Each of the transmitting and receiving microphones 31-34 is configured to output the transmitting wave and to receive the reflected wave. In the first case shown in FIG. 6A, one of the transmitting and receiving microphones 31-34 outputs the transmitting wave. In the second case shown in FIG. 6B, all of the transmitting and receiving microphones 31-34 output the transmitting wave in the same phase. In the third case shown in FIG. 6C, any two of the transmitting and receiving microphones 31-34 adjacent to each other in the vertical direction output the transmitting wave in the same phase, and any two of the transmitting and receiving microphones 31-34 adjacent to each other in the horizontal direction output the transmitting wave in the opposite phase. Transmitting sound pressure of the first to third cases are shown in FIG. 6D. In a case where all of the transmitting and receiving microphones 31-34 output the transmitting wave in the same phase, which is shown by the solid line in FIG. 6D, a directivity in the direction detecting direction is increased in a narrow-angle range compared with a case where only one of the transmitting and receiving microphones 31-34 outputs the transmitting wave, which is shown by the dashed-two dotted line. In a case where the transmitting wave is output in the opposite phase, which is shown by the dashed line, the directivity of the direction detecting direction is increased in a wide-angle range compared with a case where only one of the transmitting and receiving microphones 31-34 outputs the transmitting wave.

The same applies to the transmitting microphones 4a and 4b. When the transmitting microphones 4a and 4b output the transmitting wave in the same phase, the directivity in the direction detecting direction is enhanced in a narrow-angle range. Thus, the detection accuracy in the narrow-angle range is high, and the detection accuracy in a wide-angle range is low or the obstacle detection device 21 cannot detect an obstacle in the wide-angle range. In contrast, when the transmitting microphones 4a and 4b output the transmitting wave in the opposite phase, the directivity in the direction detecting direction is enhanced in a wide-angle range. Thus, the detection accuracy in the wide-angle range is high, and the detection accuracy in the narrow-angle range is low or the obstacle detection device 21 cannot detect an obstacle in the narrow-angle range.

Figure 7:
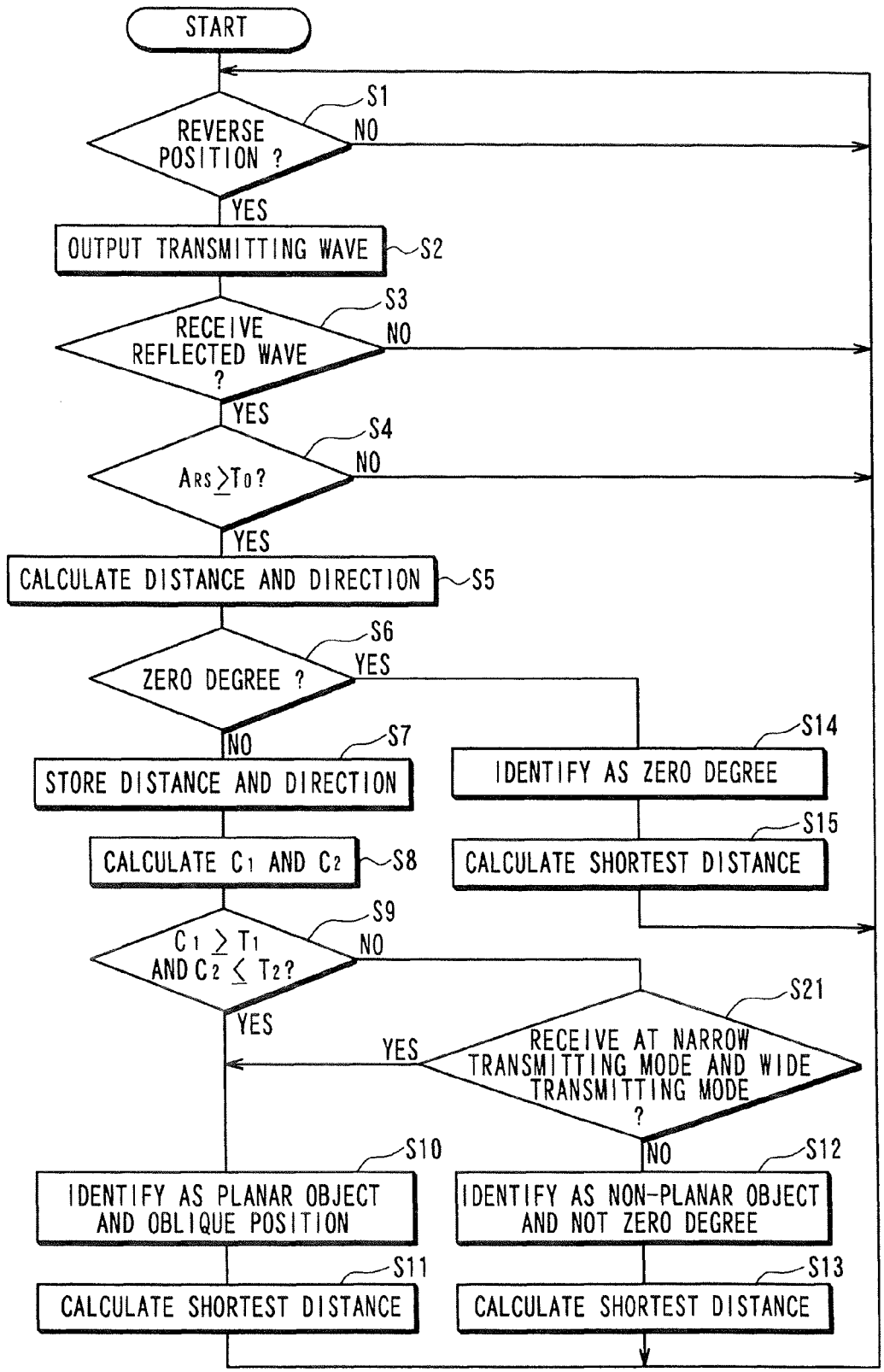
FIG. 7 is a flowchart showing processes performed by the obstacle detection device according to the second embodiment.

In the present embodiment, as shown in FIG. 7, when the obstacle detection device 21 determines that the absolute value of the amount of distance change ($C_1$) is not greater than or equal to the first threshold value ($T_1$) or the absolute value of the amount of direction change ($C_2$) is not less than or equal to the second threshold value ($T_2$), which corresponds to "NO" at S9, the obstacle detection device 21 outputs the transmitting wave in the narrow transmitting mode and the wide transmitting mode in order in stead of identifying that the obstacle is a non-planar object that does not have a planar surface in the direction detecting direction. Then, at S21, the obstacle detection device 21 determines whether the receiving microphones 5a and 5b receive the reflected wave when the transmitting wave is output in the narrow transmitting mode and when the transmitting wave is output in the wide transmitting mode.

When the obstacle detection device 21 determines that the receiving microphones 5a and 5b receive the reflected wave in both the narrow transmitting mode and the wide transmitting mode, which corresponds to "YES" at S21, the process proceeds to S10, and the determining portion 14 in the obstacle detection device 21 identifies that the obstacle is a planar object that has a planar surface in the direction detecting direction, and that a relative position of the planar surface of the obstacle to the bumper surface 18a of the rear bumper 18 is oblique. Then, the process proceeds to S11 and the obstacle detection device 21 calculates the shortest distance to the obstacle, which is identified as the planar object, at the shortest distance calculating portion 15. In other words, even when the obstacle detection device 21 determines that the absolute value of the amount of distance change is not greater than or equal to the first threshold value or the absolute value of the amount of direction change is not less than or equal to the second threshold value, if the obstacle detection device 21 determines that the receiving microphones 5a and 5b receive the reflected wave in both the narrow transmitting mode and the wide transmitting mode, the obstacle detection device 21 prioritizes the latter determination result over the former determination result.

When the obstacle detection device 21 determines that the receiving microphones 5a and 5b do not receive the reflected wave in both the narrow transmitting mode and the wide transmitting mode, that is, the obstacle detection device 21 determines that the receiving microphones 5a and 5b receive the reflected wave in only one of the narrow transmitting mode and the wide transmitting mode, which corresponds to "NO" at S21, the process proceeds to S12. At S12, the determining portion 14 in the obstacle detection device 21 identifies that the obstacle is a non-planar object that does not have a planar surface in the direction detecting direction and that the direction of the obstacle is not zero degree. Then, the process proceeds to S13 and the obstacle detection device 21 calculates the shortest distance to the obstacle, which is identified as the non-planar object, at the shortest distance calculating portion 15.

Figure 8A:
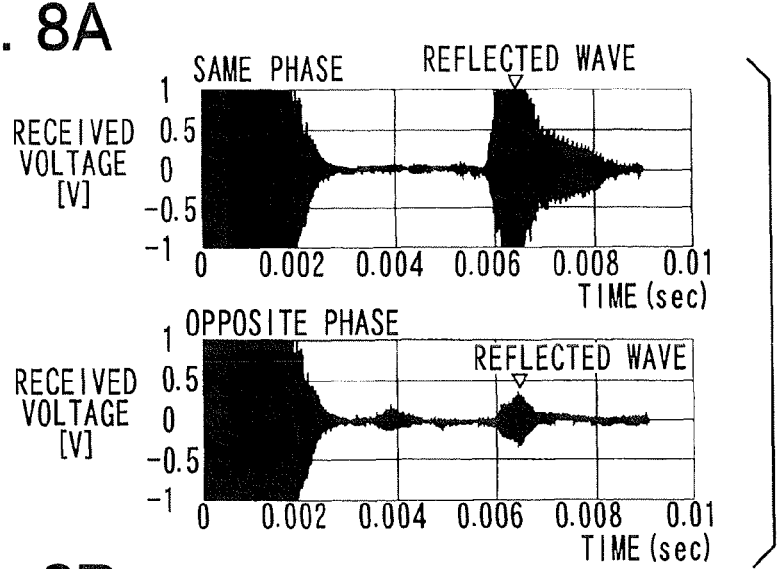
FIG. 8A is a graph showing a relationship between a time and a received voltage when an obstacle is a wall.
Figure 8B:
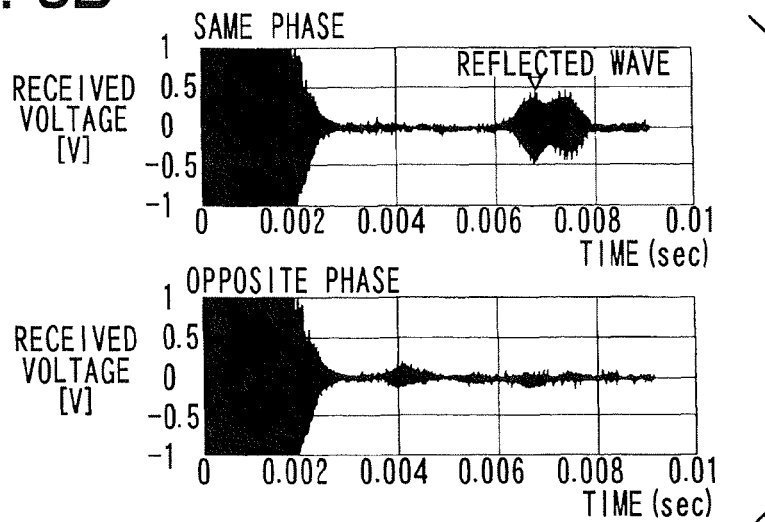
FIG. 8B and FIG. 8C are graphs showing relationships between a time and a received voltage when an obstacle is a pole.
Figure 8C:
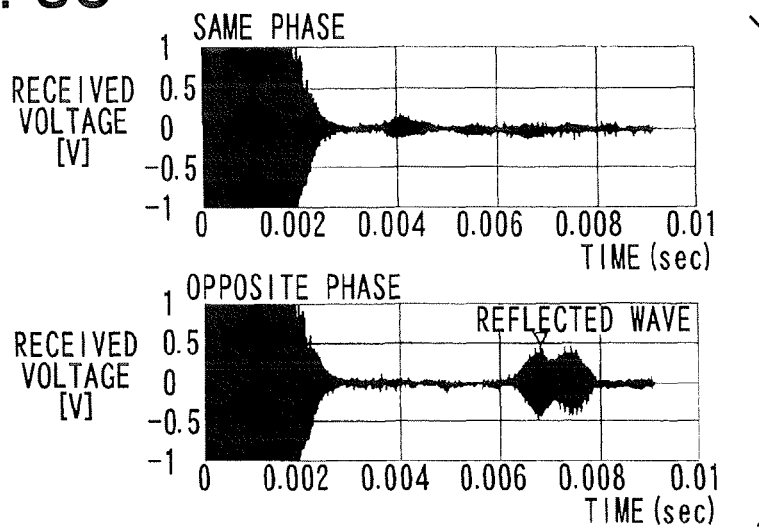

When the obstacle is a wall that has a planar surface in the direction detecting direction, the receiving microphones 5a and 5b receive the reflected wave in both the narrow transmitting mode in which the transmitting wave is output in the same phase and the wide transmitting mode in which the transmitting wave is output in the opposite phase although there is a difference in the receiving voltage, as shown in FIG. 8A. When the obstacle is a pole that does not have a planar surface, the receiving microphones 5a and 5b may receive the reflected wave in only one of the narrow transmitting mode in which the transmitting wave is output in the same phase and the wide transmitting mode in which the transmitting wave is output in the opposite phase, as shown in FIG. 8B and FIG. 8C.

In the present embodiment, in view of the above-described phenomenon, the obstacle detection device 21 identifies that the obstacle is a planar object that has a planar surface in the direction detecting direction when the receiving microphones 5a and 5b receive the reflected wave in both the narrow transmitting mode and the wide transmitting mode. In addition, the obstacle detection device 21 identifies that the obstacle is a non-planar object that does not have a planar surface in the direction detecting direction when the receiving microphones 5a and 5b receive the reflected wave in only one of the narrow transmitting mode and the wide transmitting mode.

As described above, when the obstacle detection device 21 determines that the reflected wave is received in both the narrow transmitting mode and the wide transmitting mode, the obstacle detection device 21 determines that the obstacle is a planar object. When the obstacle detection device 21 determines that the reflected wave is received in only one of the narrow transmitting mode and the wide transmitting mode, the obstacle detection device 21 determines that the obstacle is a non-planar object. Thus, the obstacle detection device 21 can identify the shape of the obstacle more appropriately.

(Other Embodiments)

Although the present invention has been fully described in connection with the preferred embodiments thereof with reference to the accompanying drawings, it is to be noted that various changes and modifications will become apparent to those skilled in the art.

For example, the transmitting elements and the receiving elements may be elements including an acoustic matching member as disclosed, for example, in JP-A-2009-225419. A plurality of obstacle detection devices 1 or 21 may be disposed on the bumper surface 18a of the rear bumper 18 of the vehicle body 17 along a longitudinal direction of the bumper surface 18a. The obstacle detection device 1 or 21 may also be disposed on a bumper surface of a front bumper of a vehicle body or a side surface of the vehicle body. In a case where a movable body is large, a plurality of obstacle detection devices 1 or 21 may be disposed on the same surface in such a manner that detection areas of the obstacle detection devices 1 or 21 are shifted from each other or partially overlapped.

The transmitting microphone for outputting the transmitting wave and the receiving microphone for receiving the reflected wave need not be disposed separately and a transmitting and receiving microphone that is configured to output the transmitting wave and to receive the reflected wave may also be disposed. The transmitting and receiving microphone may include an acoustic matching member.

Not only when the direction of the obstacle is determined as not zero degree, even when the direction of the object is determined as zero degree, the obstacle detection device 21 may identify whether the obstacle is a planar object or a non-planar object by outputting the transmitting wave in the narrow transmitting mode and the wide transmitting mode. In other words, the obstacle detection device 21 may identify the obstacle as a planar object when the obstacle detection device 21 determines that the reflected wave is received in both the narrow transmitting mode and the wide transmitting mode, and the obstacle detection device 21 may identify the obstacle as a non-planar object when the obstacle detection device 21 determines that the reflected wave is received in only one of the narrow transmitting mode and the wide transmitting mode.

The process at S6 where each of the obstacle detection devices 1 and 21 determines whether the calculated direction is zero degree may be omitted, and each of the obstacle detection devices 1 and 21 may store the calculated distance and the direction of the obstacle at the memory 11 at S7 regardless of the calculated direction and may execute subsequent processes.

In an obstacle detection device that switches the narrow transmitting mode in which the transmitting microphones 4a and 4b output the transmitting wave in the same phase and the wide transmitting mode in which the transmitting microphones 4a and 4b output the transmitting wave in the opposite phase, only when the absolute value of the amount of distance change is greater than or equal to the first threshold value, the absolute value of the amount of direction change is less than or equal to the second threshold value, and the receiving microphones 5a and 5b receive the reflected wave in both the narrow transmitting mode and the wide transmitting mode, the obstacle detection device may identify that the obstacle is a planar object having a planar surface in the direction detecting direction and that the relative position of the planar surface of the obstacle to the bumper surface 18a of the rear bumper 18 is oblique.

The receiving microphones 5a and 5b may also be arranged adjacent to each other in a vertical direction with respect to the ground surface. In the present case, the direction detecting direction is the vertical direction. Thus, the obstacle detection device 1 or 21 can identify the shape of the obstacle in the vertical direction with respect to the ground surface. For example, the obstacle detection device 1 or 21 can identify a bar. The obstacle detection device 1 or 21 may also include three receiving microphones arranged in a triangular shape. In the present case, the obstacle detection device 1 or 21 can identify the shape of the obstacle in three-dimensional direction, that is, both in the horizontal direction and the vertical direction with respect to the ground. For example, the obstacle detection device 1 or 21 can identify an obstacle as a pole or a bar. The obstacle detection device 1 or 21 may also include four receiving microphones arranged in a square shape in such a manner that two receiving microphones are adjacent to each other in the horizontal direction with respect to the ground and two receiving microphones are adjacent to each other in the vertical direction.

When a plurality of transmitting microphones is provided, the transmitting microphones may be adjacent to each other in a vertical direction with respect to the ground surface, and a narrow transmitting mode in which the transmitting microphones output a transmitting wave in the same phase and a wide transmitting mode in which the transmitting microphones output the transmitting wave in the opposite phase may be switched. A plurality of transmitting microphones may also be arranged in a triangular shape, and a narrow transmitting mode in which the transmitting microphones output a transmitting wave in the same phase and a wide transmitting mode in which the transmitting microphones output the transmitting wave in the opposite phase may be switched.

Even when an obstacle is another parked vehicle, the obstacle detection device 1 or 21 can identify the parked vehicle as a planar object. Even when an obstacle is a person, the obstacle detection device 1 or 21 can identify the person as a non-planar object.

Figure 9:
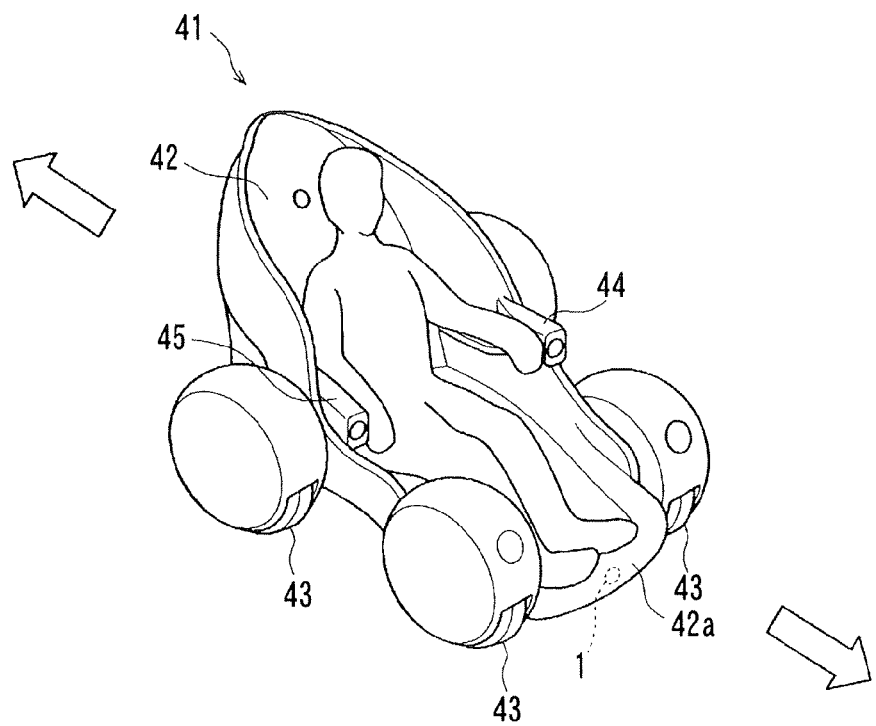
FIG. 9 is a diagram showing a state where the obstacle detection device according to the first embodiment is disposed on a wheelchair vehicle.

The movable body is not limited to the vehicle 16. For example, the movable body may also be a wheelchair vehicle 41 as shown in FIG. 9. The wheelchair vehicle 41 includes a vehicle body 42 and four driving wheels 43 (only three driving wheels 43 are shown in FIG. 9) attached to the vehicle body 42. The vehicle body 42 includes a seat on which a driver sits. On a left side of the vehicle body 42 from the driver, a left arm rest control panel 44 is disposed. On a right side of the vehicle body 42 from the driver, a right arm rest control panel 45 is disposed. The obstacle detection device 1 or 21 is disposed on a front end surface 42a of the vehicle body. The obstacle detection device 1 or 21 may also be disposed on a rear end or a side surface of the vehicle body 42.

Figure 10:
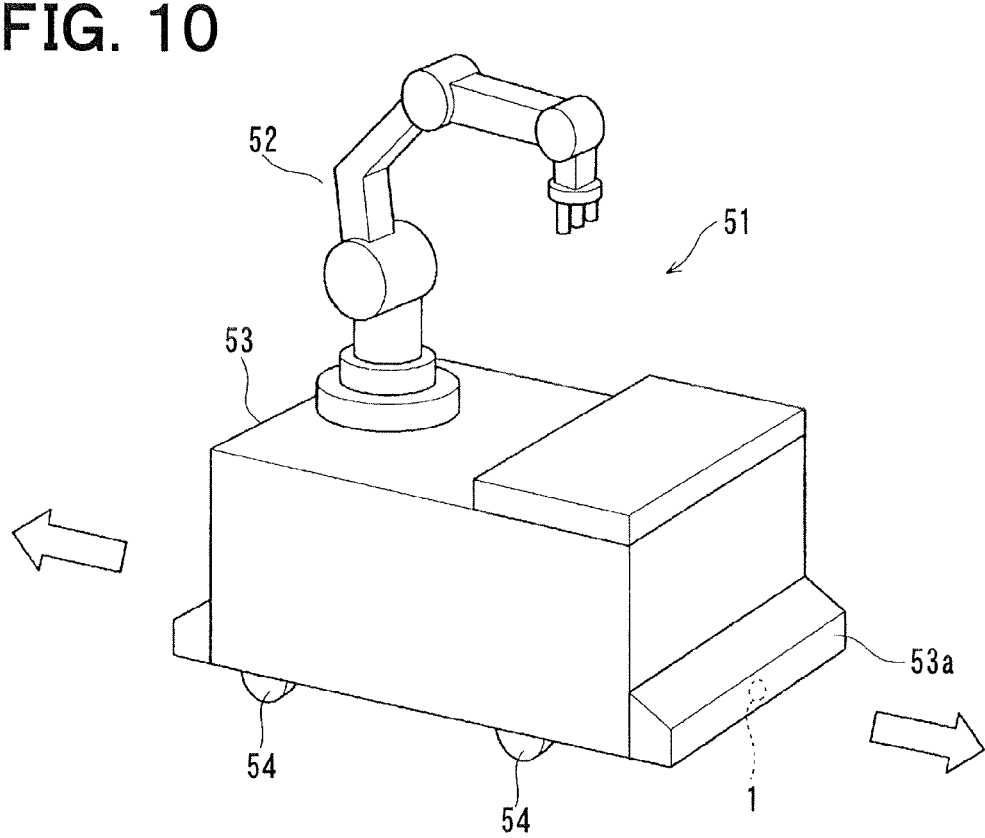
FIG. 10 is a diagram showing a state where the obstacle detection device according to the first embodiment is disposed on a movable robot.

The movable body may also be a movable robot 51 as shown in FIG. 10. The movable robot 51 performs assembling work while moving in a factory site. The movable robot 51 includes a robot arm 52, a carrying base 53, and four driving wheels 54 (only two driving wheels 54 are shown in FIG. 10) attached to the carrying base 53. The robot arm 52 is a six-axial arm. The four driving wheels 54 are driven by a motor and thereby the movable robot 51 can move along a guide line or a guide sensor placed in the factory site. The obstacle detection device 1 or 21 is disposed on a front end surface 53a of the carrying base 53. The obstacle detection device 1 or 21 may also be disposed on a rear end or a side surface of the carrying base 53. When the obstacle detection device 1 or 21 is disposed on the movable robot 51, the movable robot 51 can detect work equipment placed in the factory side and a working object as obstacles. The movable robot is not limited to a vehicular movable robot including the driving wheels 54 and may also be a two-legged movable robot.

Figure 11:
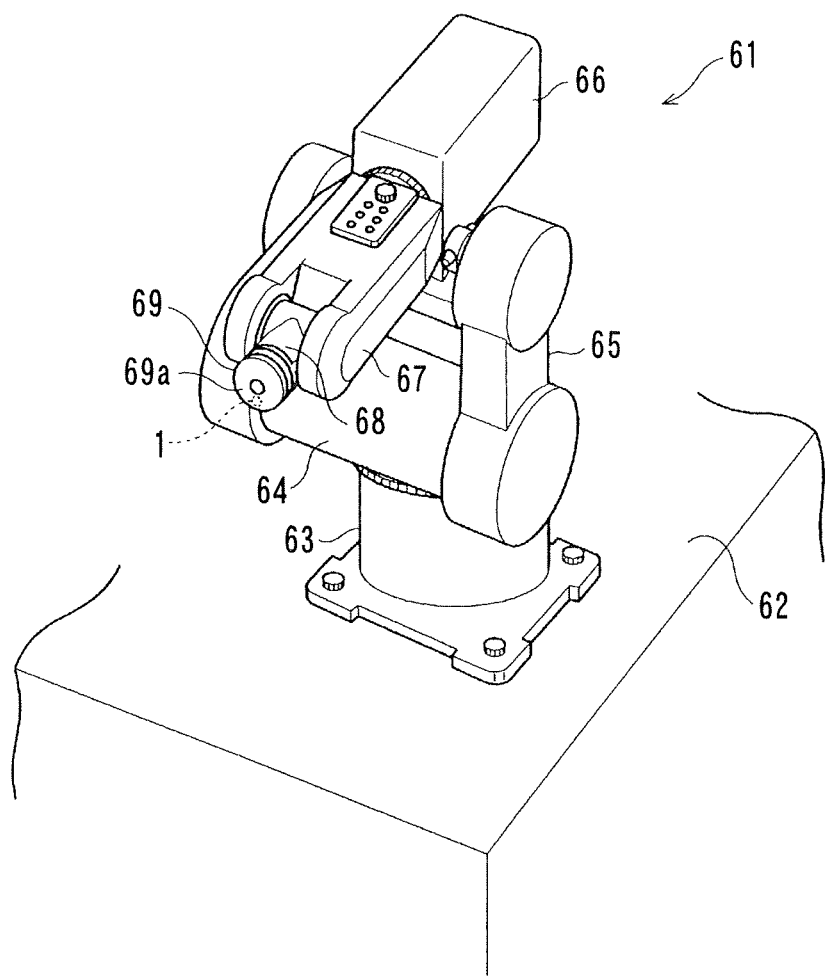
FIG. 11 is a diagram showing a state where the obstacle detection device according to the first embodiment is disposed on a movable part of a fixed robot.

The movable body may also be a movable part of a fixed robot 61 as shown in FIG. 11. The fixed robot 61 is, for example, a six-axial vertical articulated robot and is set up on a working bench 62. The fixed robot 61 includes a base 63, a shoulder 64, a lower arm 65, a first upper arm 66, a second upper arm 67, a wrist 68, and a flange 69. The base 63 is fixed to the working bench 62. The shoulder 64 is supported by the base 63 so as to be rotatable in the horizontal direction. The lower arm 65 is supported by the shoulder 64 so as to be rotatable in the vertical direction. The first upper arm 66 is supported by the lower arm 65 so as to be rotatable in the vertical direction. The second upper arm 67 is supported at an end portion of the first upper arm 66 so as to be twistable. The wrist 68 is supported by the second upper arm 67 so as to be rotatable in the vertical direction. The flange 69 is supported by the wrist 68 so as to be twistable. The flange 69 corresponds to the movable part. A hand (not shown) for gripping a work is mountable to the flange 69. The flange 69 has a surface on which the obstacle detection device 1 or 21 is disposed. The obstacle detection device 1 or 21 may be disposed at any movable part. When the obstacle detection device 1 or 21 is disposed on the movable part of the fixed robot 61, the fixed robot 61 can detect working equipment placed in a movable area of the movable part and a working object as obstacles.

What is claimed is:

1. An obstacle detection device mountable on a surface of a movable body, comprising:
    a transmitting portion including one or more transmitting elements and outputting an ultrasonic wave from the one or more transmitting elements as a transmitting wave;
    a receiving portion including a plurality of receiving elements disposed in an array and receiving a reflected wave at the plurality of receiving elements, the reflected wave being the transmitting wave reflected by an obstacle;
    a distance calculating portion calculating a distance to the obstacle based on a time difference between a transmitting time when the transmitting portion outputs the transmitting wave and a receiving time when the receiving portion receives the reflected wave and a speed of the transmitting wave;
    a direction calculating portion calculating a direction of the obstacle based on a phase difference between a phase of the reflected wave received with one of the plurality of receiving elements and a phase of the reflected wave received with another of the plurality of receiving elements, a distance between the one of the plurality of receiving elements and the another of the plurality of receiving elements, and a wavelength of the transmitting wave;
    a distance storing portion storing the distance to the obstacle calculated by the distance calculating portion;
    a direction storing portion storing the direction of the obstacle calculated by the direction calculating portion;
    a distance change calculating portion calculating the amount of distance change based on the distance to the obstacle stored in the distance storing portion, the amount of distance change being generated due to a change in relative position of the obstacle to the surface of the movable body;
    a direction change calculating portion calculating the amount of direction change based on the direction of the obstacle stored in the direction storing portion, the amount of direction change being generated due to the change in relative position of the obstacle to the surface of the movable body;
    a determining portion determining a shape of the obstacle and the relative position of the obstacle to the movable body based on the direction of the obstacle calculated by the direction calculating portion, the amount of distance change calculated by the distance change calculating portion, and the amount of direction change calculated by the direction change calculating portion, the determining portion outputting a determination result; and
    a shortest distance calculating portion, wherein
    (1) when the determining portion determines that the obstacle is a planar object, the shortest distance calculating portion calculates a shortest distance "$D_x$" between the movable body and the obstacle consistent with a first formula:

$$D_x = D/\cos\theta - d \times \tan\theta, \text{ and}$$

(2) when the determining portion determines that the obstacle is a non-planar object, the shortest distance calculating portion calculates the shortest distance "$D_x$" between the movable body and the obstacle consistent with a second formula:

$$D_x = D \times \tan\theta$$

where
    "D" is the distance to the obstacle calculated by the distance calculating portion,
    "$\theta$" is the direction of the obstacle calculated by the direction calculating portion, and
    "d" is a distance between a shortest distance calculating point of the surface of the movable body and a position at which the obstacle detection device is disposed, and
    the shortest distance calculating portion outputs a calculation result.

2. The obstacle detection device according to claim 1, wherein:
    the transmitting portion includes a plurality of transmitting elements;
    the transmitting portion is switchable between a narrow transmitting mode in which the plurality of transmitting elements outputs the transmitting wave in a same phase and a wide transmitting mode in which the plurality of transmitting elements outputs the transmitting wave in an opposite phase;
    the determining portion determines reception status of the plurality of receiving elements when the transmitting wave is output in the narrow transmitting mode and reception status of the plurality of receiving elements when the transmitting wave is output in the wide transmitting mode; and
    the determining portion determines the shape of the obstacle also based on the reception status.

3. The obstacle detection device according to claim 2, wherein:
    the plurality of transmitting elements includes two transmitting elements adjacent to each other in a horizontal direction with respect to a plane on which the movable body moves;
    the transmitting portion is switchable between the narrow transmitting mode and the wide transmitting mode for the two transmitting elements; and
    the plurality of receiving elements includes two receiving elements adjacent to each other in the horizontal direction.

4. The obstacle detection device according to claim 2, wherein:
    the plurality of transmitting elements includes two transmitting elements adjacent to each other in a vertical direction with respect to a plane on which the movable body moves;
    the transmitting portion is switchable between the narrow transmitting mode and the wide transmitting mode for the two transmitting elements; and
    the plurality of receiving elements includes two receiving elements adjacent to each other in the vertical direction.

5. The obstacle detection device according to claim 2, wherein:
    the plurality of transmitting elements includes three transmitting elements adjacent to each other in a triangular shape;
    the transmitting portion is switchable between the narrow transmitting mode and the wide transmitting mode for a pair in the three transmitting elements;

the transmitting portion is also switchable between the narrow transmitting mode and the wide transmitting mode for another pair in the three transmitting elements; and the plurality of receiving elements includes three receiving elements adjacent to each other in a triangular shape.

6. The obstacle detection device according to claim 1, wherein the movable body is a vehicle.

7. The obstacle detection device according to claim 1, wherein the movable body is a movable robot.

8. The obstacle detection device according to claim 1, wherein the movable body is a movable part of a fixed robot.

* * * * *